US010661728B2

(12) United States Patent
Tsuji et al.

(10) Patent No.: US 10,661,728 B2
(45) Date of Patent: May 26, 2020

(54) LICENSE PLATE SUPPORT MECHANISM AND WORK VEHICLE EQUIPPED WITH LICENSE PLATE SUPPORT MECHANISM

(71) Applicant: KUBOTA CORPORATION, Osaka (JP)

(72) Inventors: Kenichiro Tsuji, Osaka (JP); Shigeo Sakamoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/017,130

(22) Filed: Jun. 25, 2018

(65) Prior Publication Data

US 2019/0039537 A1 Feb. 7, 2019

(30) Foreign Application Priority Data

Aug. 2, 2017 (JP) .................................. 2017-149861

(51) Int. Cl.
 *B60R 13/10* (2006.01)
 *B60Q 1/56* (2006.01)
 *B62D 25/16* (2006.01)

(52) U.S. Cl.
 CPC .............. *B60R 13/105* (2013.01); *B60Q 1/56* (2013.01); *B60Y 2200/221* (2013.01); *B62D 25/16* (2013.01)

(58) Field of Classification Search
 CPC . B60R 13/105; B60Y 2200/221; B62D 25/16; B60Q 1/56
 USPC ............... 248/480, 917, 466, 424, 429, 430; 40/200, 211
 See application file for complete search history.

(56) References Cited

U.S. PATENT DOCUMENTS

| 6,433,680 B1 * | 8/2002 | Ho .......................... B60Q 1/22 180/169 |
| 7,818,905 B1 * | 10/2010 | Stahel ................... B60R 13/105 224/496 |
| 8,245,996 B1 * | 8/2012 | Ciabaszewski ....... B60R 13/105 248/286.1 |

(Continued)

FOREIGN PATENT DOCUMENTS

| JP | 56-136846 | 10/1981 |
| JP | 2013-147151 | 8/2013 |
| JP | 5785104 | 9/2015 |

OTHER PUBLICATIONS

Extended European Search Report in European Patent Application No. 18178461.2 dated Sep. 27, 2018.

*Primary Examiner* — Muhammad Ijaz
(74) *Attorney, Agent, or Firm* — Greenblum & Bernstein, P.L.C.

(57) ABSTRACT

A license plate support mechanism is equipped with an attachment portion to which a license plate can be attached, a fixation portion fixating the attachment portion to a vehicle body, and a switching mechanism. The switching mechanism couples the attachment portion to the fixation portion such that the attachment portion is capable of displacing relative to the fixation portion. The switching mechanism also enables the attachment portion to switch between a storage position, in which the attachment portion is stored on a left/right direction inward side of a left/right pair of rear wheel fenders, and a display position, in which the attachment portion is positioned on the left/right direction outward side of the left/right pair of rear wheel fenders.

16 Claims, 13 Drawing Sheets

(56) References Cited

U.S. PATENT DOCUMENTS

| | | | |
|---|---|---|---|
| 9,242,610 B2* | 1/2016 | DeGrazia | F16M 11/14 |
| 2008/0179486 A1* | 7/2008 | Russell | B62J 11/00 |
| | | | 248/479 |
| 2014/0026451 A1* | 1/2014 | Gillespie | G09F 13/04 |
| | | | 40/578 |
| 2014/0346307 A1* | 11/2014 | Tran | B60R 13/105 |
| | | | 248/475.1 |
| 2018/0001836 A1* | 1/2018 | Pan | B60R 1/00 |
| 2019/0039537 A1* | 2/2019 | Tsuji | B60R 13/105 |

* cited by examiner

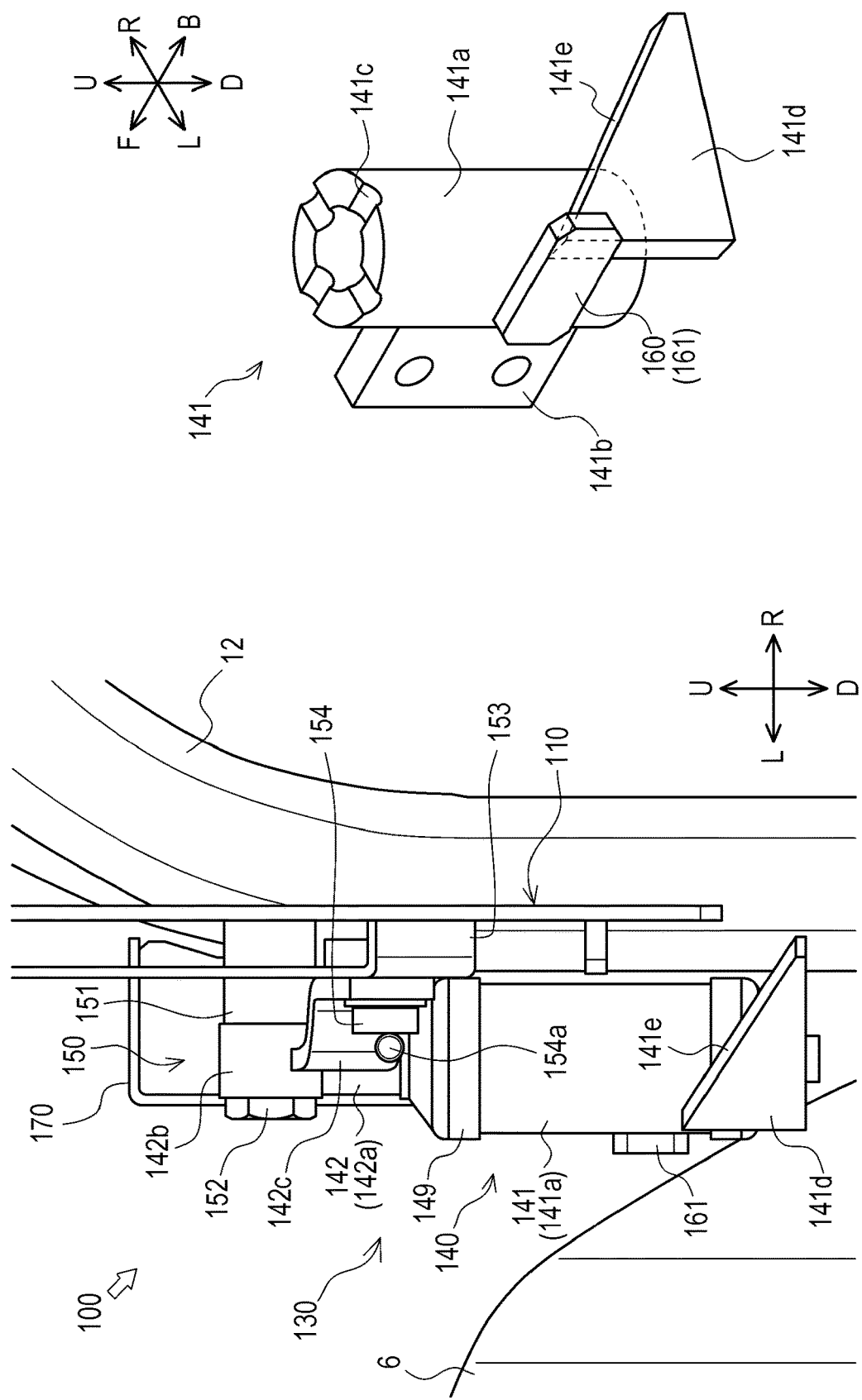

LICENSE PLATE SUPPORT MECHANISM AND WORK VEHICLE EQUIPPED WITH LICENSE PLATE SUPPORT MECHANISM

CROSS-REFERENCE TO RELATED APPLICATIONS

The present application claims priority under 35 U.S.C. § 119 of Japanese Application No. 2017-149861, filed on Aug. 2, 2017, the disclosure of which is expressly incorporated by reference herein in its entirety.

BACKGROUND OF THE INVENTION

1. Field of the Invention

The present invention relates to a license plate support mechanism and a work vehicle equipped with the license plate support mechanism.

2. Description of Related Art

Conventionally, technology relating to a license plate support mechanism is known, such as that described in Japanese Patent No. 5785104.

In the technology described in Japanese Patent No. 5785104, a work vehicle is disclosed that includes a left/right pair of rear wheel fenders covering a left/right pair of rear wheels from above and a cross frame linking inner side wall portions of the rear wheel fenders. The license plate (number plate) can be attached to a center portion of the cross frame.

When the license plate is attached in this way, there is a chance that the license plate may become more difficult to see from the rear when a work apparatus (such as a rotary tiller, for example) is mounted to a rear portion of a vehicle body.

Given this, instead of positioning the license plate at the center of the vehicle body (center of the cross frame), the license plate could also be positioned on a side portion of the vehicle body (further outward than the inner side wall portions of the rear wheel fenders). However, when the license plate is positioned at a side portion of the vehicle body, there is a chance that the license plate could interfere with crops (surrounding objects) such as fruit trees during work, damaging the crops.

SUMMARY OF THE INVENTION

In view of the above circumstance, the present invention provides a license plate support mechanism and a work vehicle equipped with the license plate support mechanism that can ensure visibility of a license plate while still constraining the license plate from interfering with surrounding objects.

A problem to be solved by the present invention is as described above, and may be resolved as described below.

Specifically, according to one aspect of the present invention, a license plate support mechanism is equipped with an attachment portion to which a license plate can be attached; a fixation portion fixating the attachment portion to a vehicle body; and a switching mechanism that couples the attachment portion to the fixation portion such that the attachment portion is capable of displacing relative to the fixation portion, and that also enables the attachment portion to switch between a storage position, in which the attachment portion is stored on a left/right direction inward side of a left/right pair of rear wheel fenders, and a display position, in which the attachment portion is positioned on the left/right direction outward side of the left/right pair of rear wheel fenders.

According to another aspect of the present invention, the attachment portion is formed in a flat plate shape having an attachment surface where the license plate is attached, and the switching mechanism supports the attachment portion in the storage position such that the attachment surface is oriented sideways, and supports the attachment portion in the display position such that the attachment surface is oriented rearward.

According to another aspect of the present invention, the switching mechanism is equipped with a left/right rotation mechanism that rotates the attachment portion left and right relative to the fixation portion, and a vertical rotation mechanism that rotates the attachment portion up and down relative to the fixation portion.

According to another aspect of the present invention, the support mechanism is further equipped with a regulating mechanism that regulates the downward rotation of the attachment portion in the display position.

According to another aspect of the present invention, the attachment portion is configured such that at least a portion of a top end portion of the attachment portion inclines rearward and downward in the storage position.

According to another aspect of the present invention, the attachment portion is configured such that at least a portion of the top end portion of the attachment portion inclines downward and outward in the left/right direction in the display position.

According to another aspect of the present invention, the fixation portion is provided to a safety frame that is provided between the left/right pair of rear wheel fenders.

According to another aspect of the present invention, a work vehicle is equipped with the license plate support mechanism described in any of the previous aspects.

The effects exhibited by the present invention include the following.

In one aspect of the present invention, visibility of the license plate can be ensured while still constraining the attachment portion (license plate) from interfering with surrounding objects (for example, crops). In other words, when there is no need to display the license plate, the attachment portion can be stored on the inward side of the rear wheel fenders by shifting the attachment portion to the storage position, and interference with objects around the vehicle body can be constrained.

In another aspect of the present invention, interference between the attachment portion and surrounding objects can be effectively constrained in the storage position, and visibility of the license plate can be ensured in the display position.

In another aspect of the present invention, the attachment portion can be rotated in two directions (two stages), and therefore when the position of the attachment portion is changed, interference with surrounding objects or the vehicle body is more readily avoided.

In another aspect of the present invention, the attachment portion can be prevented from falling in the display position. Accordingly, visibility of the license plate in the display position can be ensured.

In another aspect of the present invention, the field of view for a passenger can be more readily ensured. In other words, when a worker (passenger) riding forward and upward from the attachment portion looks to the rear, the attachment portion is unlikely to obstruct the field of view.

In another aspect of the present invention, the attachment portion can be constrained from interfering with surrounding objects (for example, crops) even in the display position. In other words, by providing an inclined portion to the left/right direction exterior of the top end portion of the attachment portion, interference with surrounding objects is more readily avoided.

In another aspect of the present invention, the license plate can be strongly supported.

In another aspect of the present invention, the attachment portion (license plate) can be constrained from interfering with surrounding objects (for example, crops).

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 13A is a rear view illustrating a second modification; and

FIG. 13B is a perspective view illustrating a guide portion according to the second modification.

DETAILED DESCRIPTION OF THE INVENTION

Figure 1:
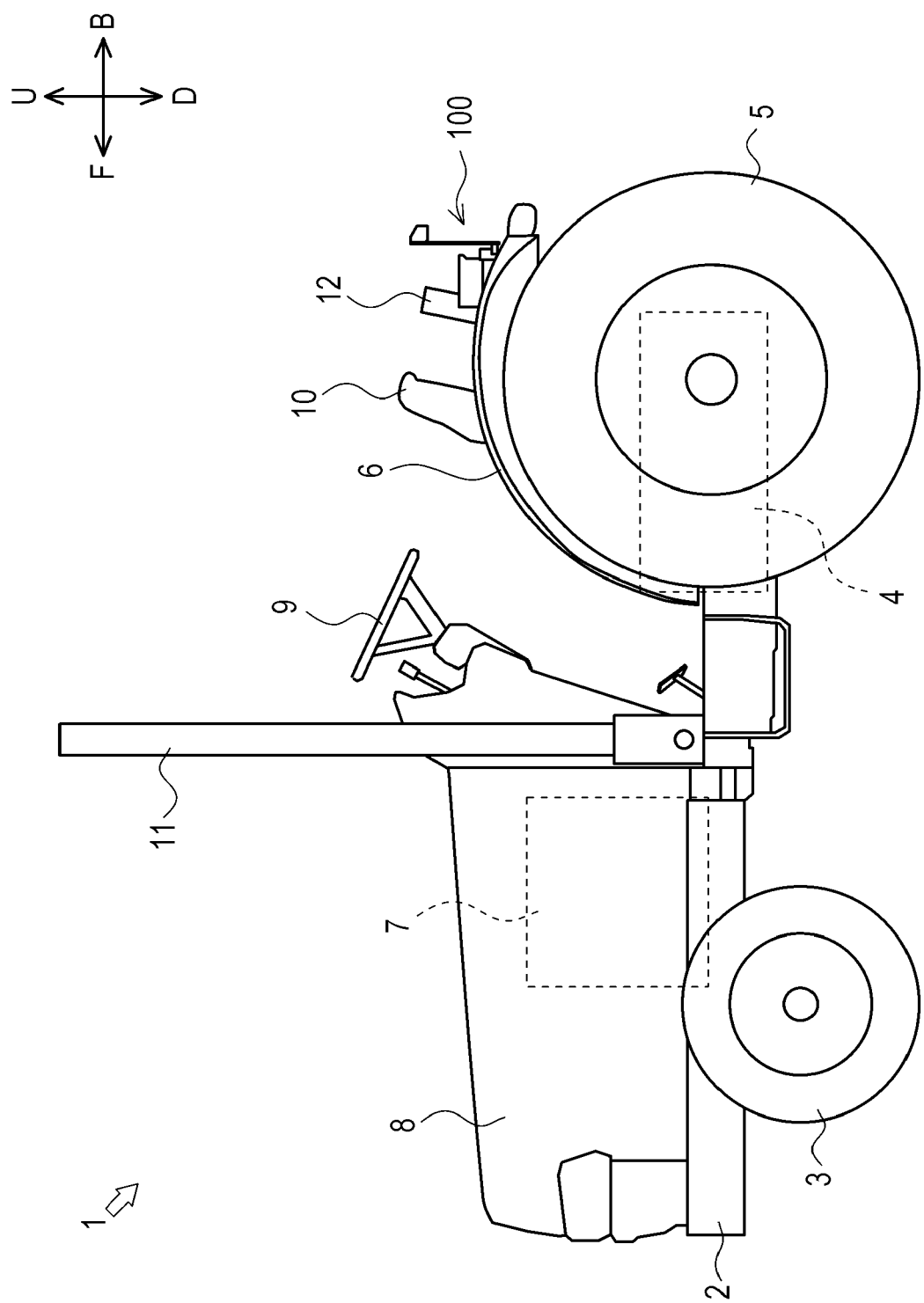
FIG. 1 is a schematic side view of a tractor equipped with a support mechanism according to a first embodiment of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

In the following, directions indicated in the drawings by arrows U, D, F, B, L, and R shall be defined in the description as an upward direction, a downward direction, a forward (front) direction, a rearward (back) direction, a left direction, and a right direction, respectively.

First, an overall configuration of a tractor 1 equipped with a license plate support mechanism (hereafter referred to simply as a "support mechanism") 100 according to a first embodiment of the present invention is described with reference to FIGS. 1 to 4.

The tractor 1 is primarily equipped with a vehicle frame 2, front wheels 3, a transmission device 4, rear wheels 5, rear wheel fenders 6, an engine 7, a hood 8, a steering wheel 9, a seat 10, a front safety frame 11, a rear safety frame 12, and the support mechanism 100.

The vehicle frame 2 is arranged with a longitudinal direction oriented in a front/back direction. A front portion of the vehicle frame 2 is supported by the left/right pair of front wheels 3. The transmission device 4 is provided in a rear portion of the vehicle frame 2. A rear portion of the transmission device 4 is supported by the left/right pair of rear wheels 5. The left/right pair of rear wheel fenders 6 cover above and forward of the rear wheels 5. The engine 7 is provided in a front/back-direction midway portion of the vehicle frame 2. The engine 7 is covered by the hood 8. Behind the engine 7, a driving/operation portion is provided that includes the steering wheel 9, various operation tools, and the seat 10, for example.

The front safety frame 11 and the rear safety frame 12 are provided to the front and rear of the driving/operation portion, respectively. The front safety frame 11 is provided to the front of the driving/operation portion so as to be capable of pivoting forward and backward. The rear safety frame 12 is provided on an inward side of inner side surfaces (side surfaces facing inward) 6a of the left/right pair of rear wheel fenders 6.

The support mechanism 100 supports a license plate (number plate) mounted on the tractor 1. The support mechanism 100 is provided to the rear safety frame 12. Details of the configuration of the support mechanism 100 are described below.

In the tractor 1 having this configuration, drive power from the engine 7 undergoes a speed change in the transmission device 4, after which the drive power can be transmitted to the front wheels 3 and the rear wheels 5 via an appropriate drive power transmission mechanism. The front wheels 3 and the rear wheels 5 are rotationally driven by the drive power of the engine 7, and this enables the tractor 1 to travel. The steering wheel 9 can adjust (modify) a turning angle of the left/right pair of front wheels 3 in response to an amount of rotational operation of the steering wheel 9, and can steer the tractor 1.

Next, the configuration of the support mechanism 100 is described.

The support mechanism 100 illustrated in FIGS. 2 to 6 supports a license plate mounted on the tractor 1. The support mechanism 100 can switch the position of an attachment portion 110 (the license plate), described below, between a display position that is visible from the rear and a storage position that is stored inward toward the vehicle body (inward compared to the display position). FIGS. 1 through 8 illustrate the license plate switched to the display position. Hereafter, the configuration of the support mechanism 100 is described with reference to this state. The support mechanism 100 is primarily equipped with the attachment portion 110, a fixation portion 120, a switching mechanism 130, a regulating mechanism 160, and a cover member 170.

The attachment portion 110 allows the attachment of the license plate (not shown in the drawings). The attachment portion 110 is formed in a flat plate shape with a thickness direction oriented in the front/back direction. The license plate can be attached to a rear surface of the attachment portion 110. The attachment portion 110 is primarily equipped with an exterior inclined portion 111, an interior inclined portion 112, and a lamp 113.

The exterior inclined portion 111 is an inclined portion formed so as to cut away a left top edge portion of an exterior circumference of the attachment portion 110. The exterior inclined portion 111 is formed so as to face left and upward (outward and upward; i.e., so as to incline from a right upper side toward a left lower side).

The interior inclined portion 112 is an inclined portion formed so as to cut away a right top edge portion of the exterior circumference of the attachment portion 110. The interior inclined portion 112 is formed so as to face right and upward (inward and upward; i.e., so as to incline from a left upper side toward a right lower side).

In this way, the attachment portion 110 is formed in a hexagonal shape in a front view, with the exterior inclined portion 111 and the interior inclined portion 112 each forming one edge.

The lamp 113 shines light on the license plate. The lamp 113 is provided to a top end portion of the rear surface of the attachment portion 110. The lamp 113 is equipped with an illumination portion capable of shining light downward (onto the rear surface of the attachment portion 110). Visibility of the license plate attached to the attachment portion 110 can be improved by the lamp 113 providing this illumination. In the following, the surface of the attachment portion 110 to which the lamp 113 is provided (surface to which the license plate is provided) may also be referred to simply as an "attachment surface."

Figure 3:
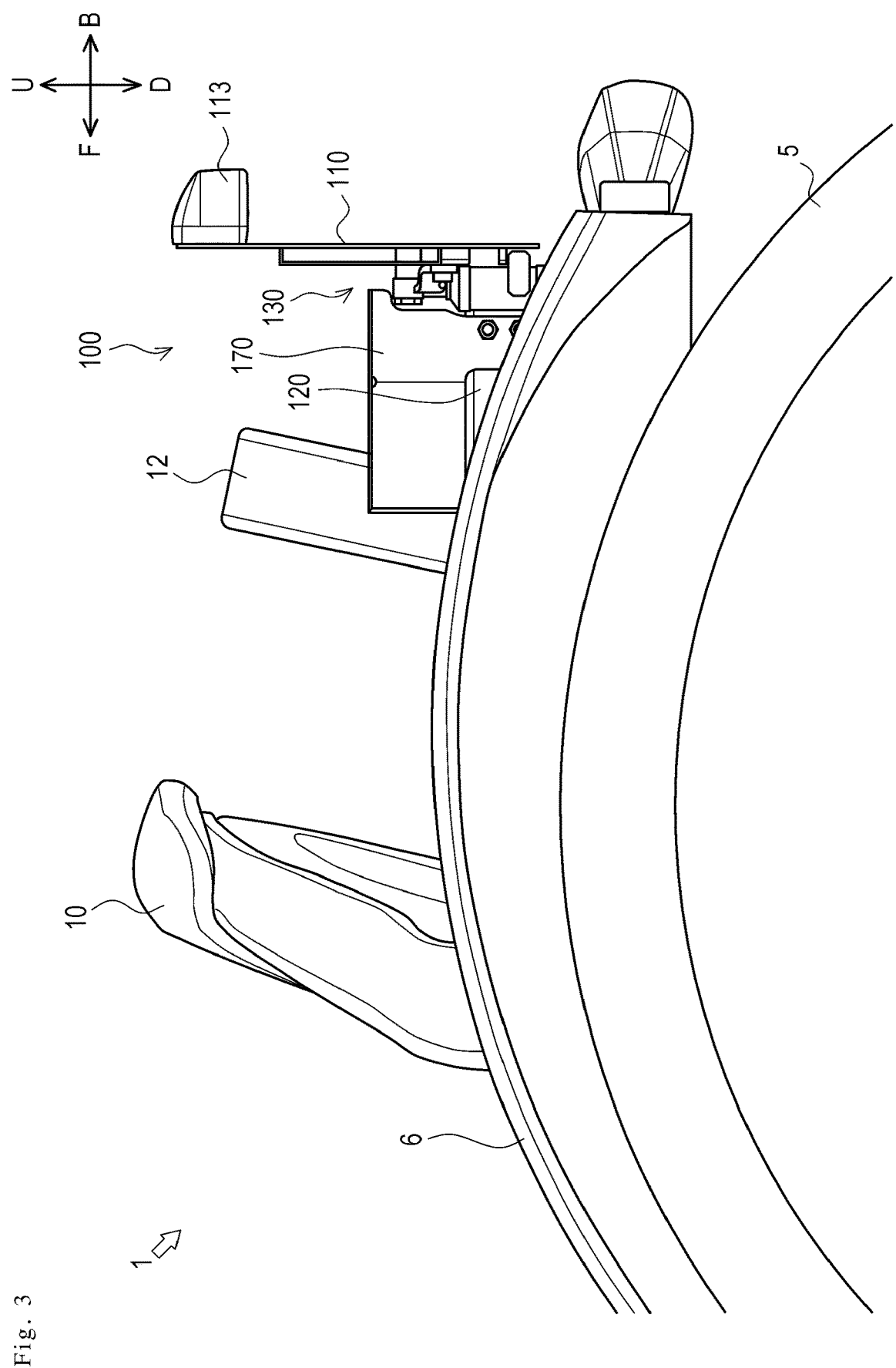
FIG. 3 is a schematic side view illustrating the support mechanism mounted on the tractor.
Figure 4:
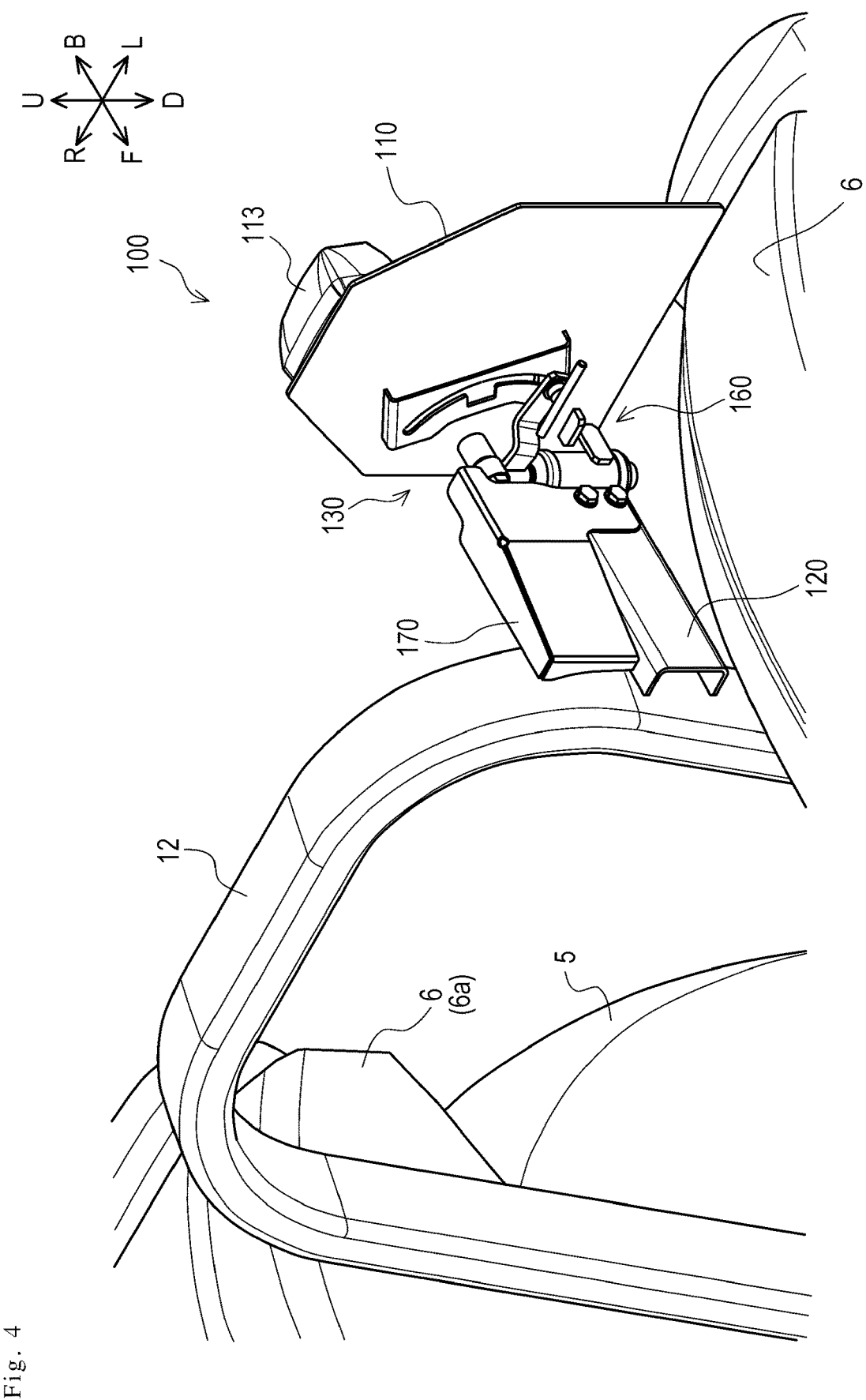
FIG. 4 is a perspective view illustrating the support mechanism mounted on the tractor.
Figure 5:
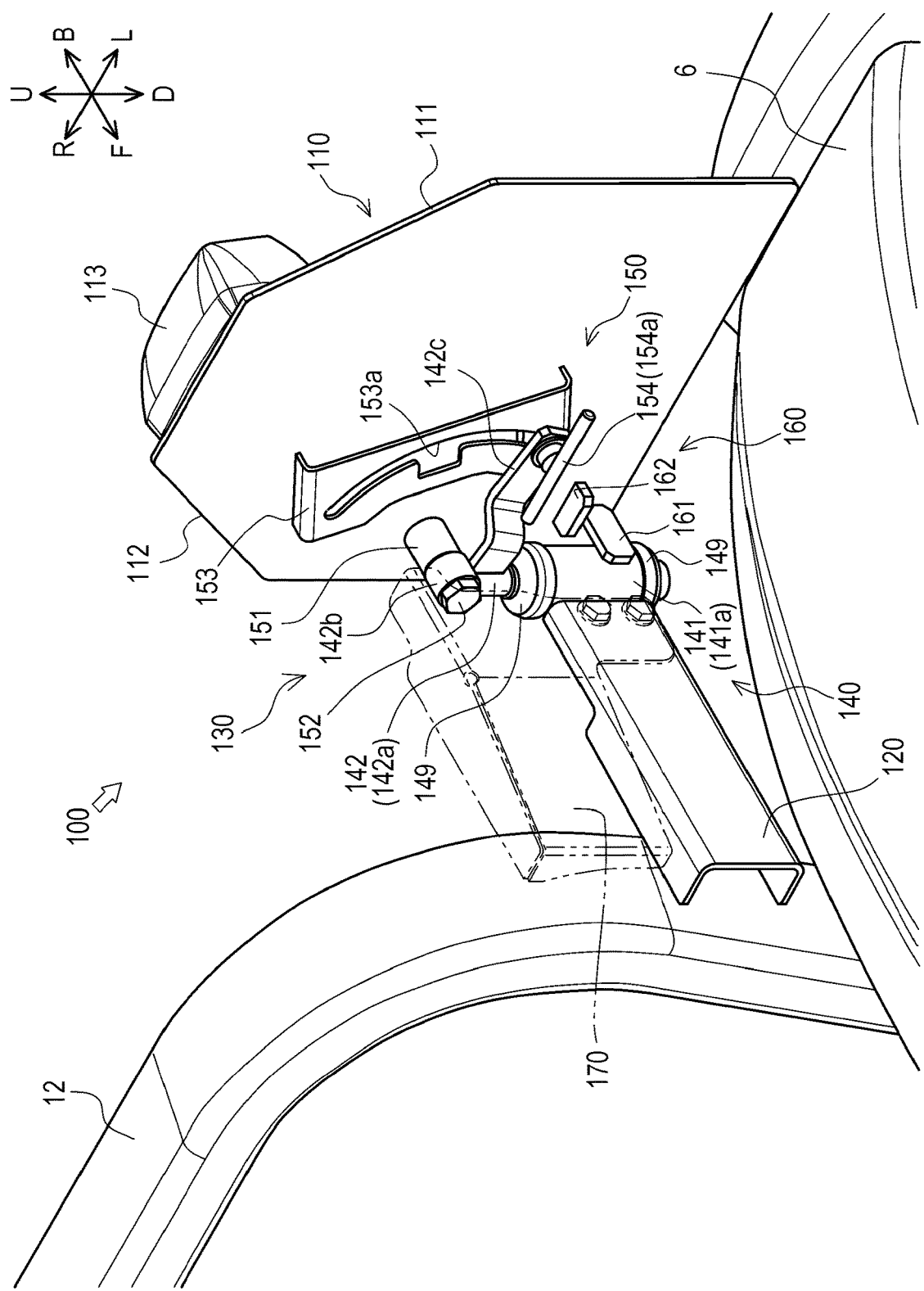
FIG. 5 is a perspective view illustrating the support mechanism when an attachment portion is in a display position.

The fixation portion 120 illustrated in FIGS. 3 to 5 fixates the attachment portion 110 to the vehicle body of the tractor 1. By having both top and bottom end portions of a plate member bend inward toward the vehicle body (rightward), the fixation portion 120 is formed in substantially a "C" shape in a rear view. The fixation portion 120 is arranged with a longitudinal direction oriented in the front/back direction. A front end portion of the fixation portion 120 is fixated by an appropriate method (for example, welding) to a left side surface of the rear safety frame 12. Thus, the fixation portion 120 is positioned so as to project rearward from the rear safety frame 12.

Figure 7:
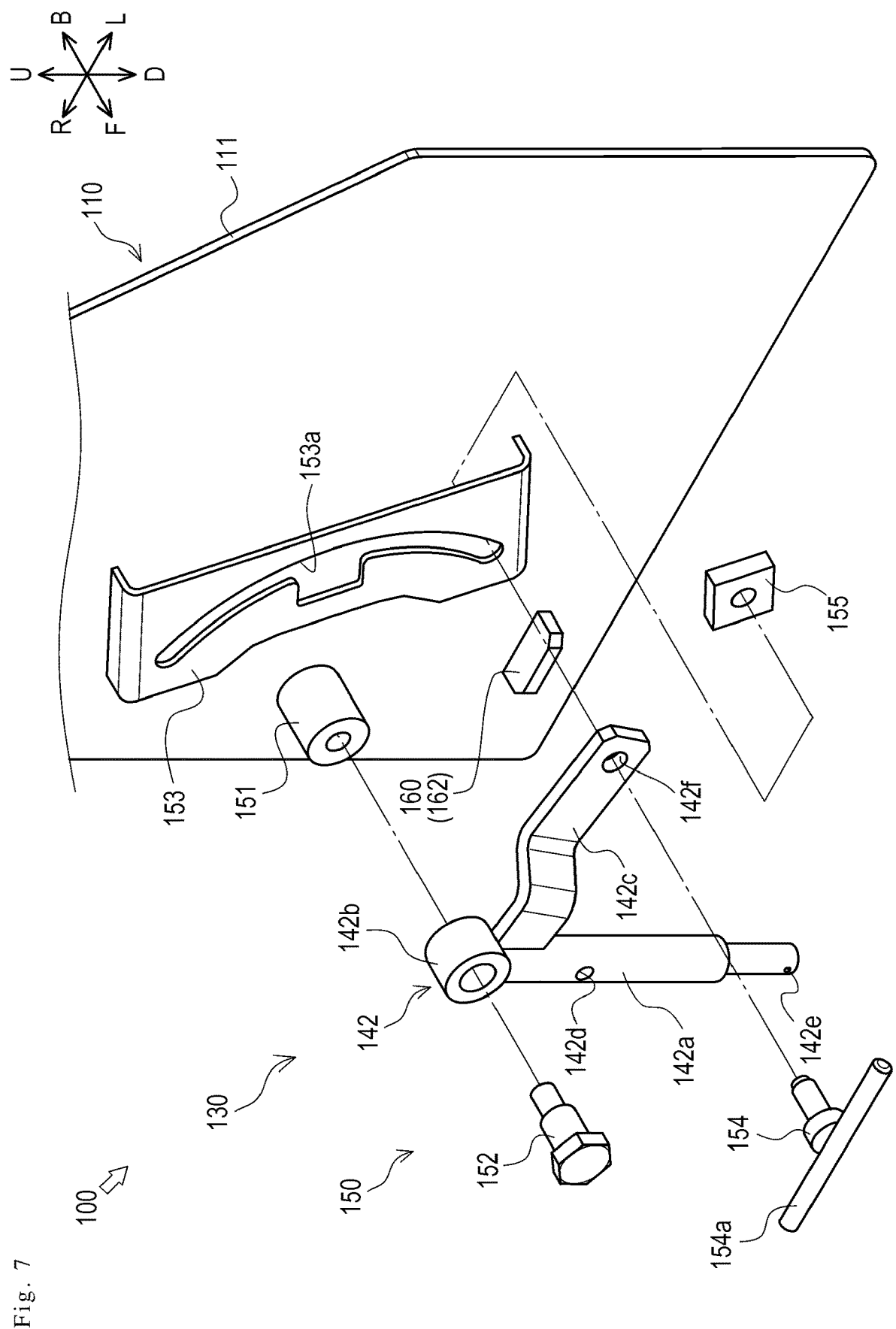
FIG. 7 is an exploded perspective view primarily illustrating a vertical rotation mechanism.
Figure 8:
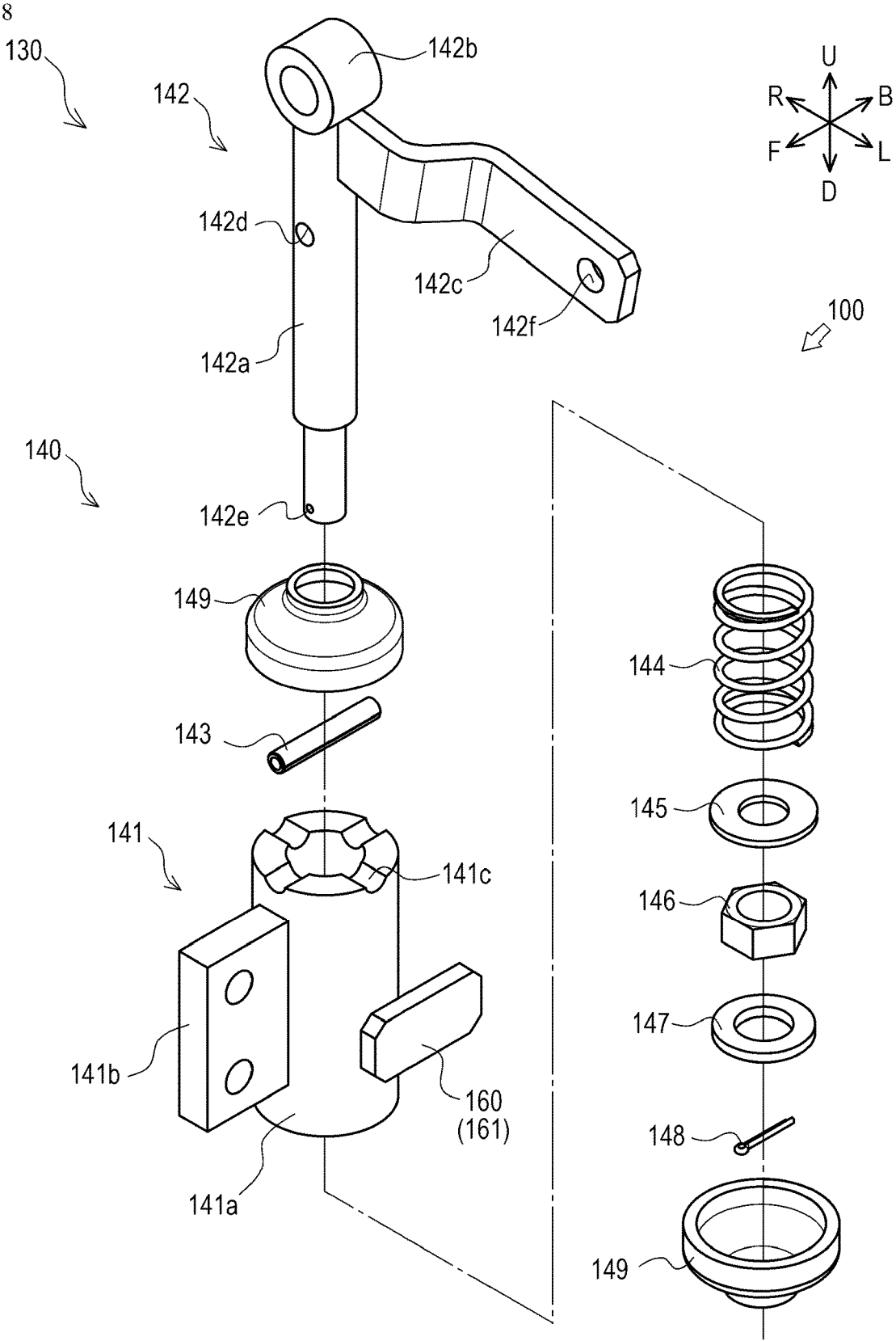
FIG. 8 is an exploded perspective view primarily illustrating a left/right rotation mechanism.

The switching mechanism 130 depicted in FIGS. 5, 7, and 8 switches the position of the attachment portion 110 between the display position and the storage position. The switching mechanism 130 is primarily equipped with a left/right rotation mechanism 140 and a vertical rotation mechanism 150.

The left/right rotation mechanism 140 depicted in FIGS. 5 and 8 rotates the attachment portion 110 to the left and right (centered on a vertical axis line). The left/right rotation mechanism 140 is primarily equipped with a support member 141, a rotating member 142, an engagement pin 143, a spring 144, a spring receiving washer 145, a nut 146, a washer 147, a pin 148, and a cover 149, for example.

The support member 141 rotatably supports the rotating member 142, which is described below. The support member 141 is primarily equipped with a cylindrical portion 141a and a fixation portion 141b.

The cylindrical portion 141a forms a primary structural body (main body) of the support member 141. The cylindrical portion 141a is formed in a cylindrical shape having an axis line oriented in the vertical direction. The cylindrical portion 141a is formed such that the inner diameter of a lower portion of the cylindrical portion 141a increases as compared to the inner diameter of an upper portion. The lower portion of the cylindrical portion 141a accommodates the spring 144, for example, described below. An engagement groove 141c is formed on an upper surface of the cylindrical portion 141a.

The engagement groove 141c is a groove formed so as to create a recess in the upper surface of the cylindrical portion 141a. In a plan view, engagement grooves 141c are formed so as to extend in directions parallel to the front/back direction and the left/right direction (a "+" shape) passing through the center of the cylindrical portion 141a.

The fixation portion 141b is a portion fixating the cylindrical portion 141a to the vehicle body of the tractor 1. The fixation portion 141b is formed in substantially a rectangular plate shape with a thickness direction oriented in the left/right direction. A rear end portion of the fixation portion 141b is fixated to a front side surface of the cylindrical portion 141a. The fixation portion 141b is fixated to the rear end portion of the fixation portion 120 using an appropriate bolt, for example (see FIG. 5). In this way, the cylindrical portion 141a (support member 141) is fixated to the vehicle body (rear safety frame 12) of the tractor 1 via the fixation portion 120.

The rotating member 142 rotates relative to the support member 141. The rotating member 142 is primarily equipped with a shaft 142a, a cylindrical portion 142b, and an arm 142c.

The shaft 142a is a substantially circular columnar portion with an axial direction oriented in the vertical direction. By inserting the shaft 142a into the cylindrical portion 141a of the support member 141, the shaft 142a is supported so as to be capable of rotating relative to the support member 141. Through-holes 142d and 142e which run through the shaft 142a in the front/back direction are formed in the vicinity of a top end portion and a bottom end portion of the shaft 142a, respectively.

The cylindrical portion 142b is a substantially cylindrical portion with an axial direction oriented in the front/back direction. The cylindrical portion 142b is fixated to the top end of the shaft 142a by an appropriate method.

The arm 142c is formed in a plate shape with a thickness direction oriented in substantially the front/back direction. The arm 142c is arranged with a longitudinal direction oriented in substantially the left/right direction. One end (right end) of the arm 142c is fixated by an appropriate method to a left side surface of the top end portion of the shaft 142a. This fixates the arm 142c such that the arm 142c extends leftward from the shaft 142a. A left/right-direction midway portion of the arm 142c is suitably bent. This forms the left end portion of the arm 142c so as to be positioned further rearward than the right end portion of the arm 142c. A through-hole 142f running through the arm 142c in the front/back direction is formed on the left end portion of the arm 142c.

The engagement pin 143 illustrated in FIG. 8 is capable of engaging with the engagement grooves 141c formed on the cylindrical portion 141a. The engagement pin 143 is formed in a substantially cylindrical shape. The length of the engagement pin 143 is configured to be substantially identical to the outer diameter of the cylindrical portion 141a.

The engagement pin 143 is inserted through the through-hole 142d of the shaft 142a and fixated, above the cylindrical portion 141a.

The spring 144 biases the rotating member 142 downward. The spring 144 is formed by a compression coil spring. The spring 144 is arranged with an axis line oriented in the vertical direction. The shaft 142a is inserted through the spring 144 on an interior of the cylindrical portion 141a.

The spring receiving washer 145 supports the spring 144 from below. The spring receiving washer 145 is formed in an annular plate shape. The spring receiving washer 145 is arranged so as to abut a bottom end of the spring 144. The shaft 142a is inserted through the spring receiving washer 145 on the interior of the cylindrical portion 141a.

The spring receiving washer 145 is fitted to the shaft 142a of the rotating member 142 by the nut 146, the washer 147, and the pin 148. Specifically, the nut 146 is fastened to the shaft 142a below the spring receiving washer 145. The shaft 142a is inserted through the washer 147, below the nut 146. Then, the pin 148 is inserted through the through-hole 142e of the shaft 142a below the washer 147. The pin 148 can prevent the nut 146, for example, from falling.

In this way, the spring receiving washer 145 is fitted to the shaft 142a so as to not fall off of the shaft 142a. The spring 144 is arranged, in a compressed state, between the spring receiving washer 145 and the cylindrical portion 141a. Thus, the spring 144 constantly biases the rotating member 142 downward via the spring receiving washer 145. Due to this biasing force, the engagement pin 143 provided to the rotating member 142 can maintain a state of engagement with the engagement groove 141c of the support member 141.

In addition, both the top and bottom end portions of the cylindrical portion 141a are covered by a cover 149. This can prevent foreign matter such as dust from infiltrating the interior of the cylindrical portion 141a (a sliding area between the cylindrical portion 141a and the shaft 142a).

Figure 6:
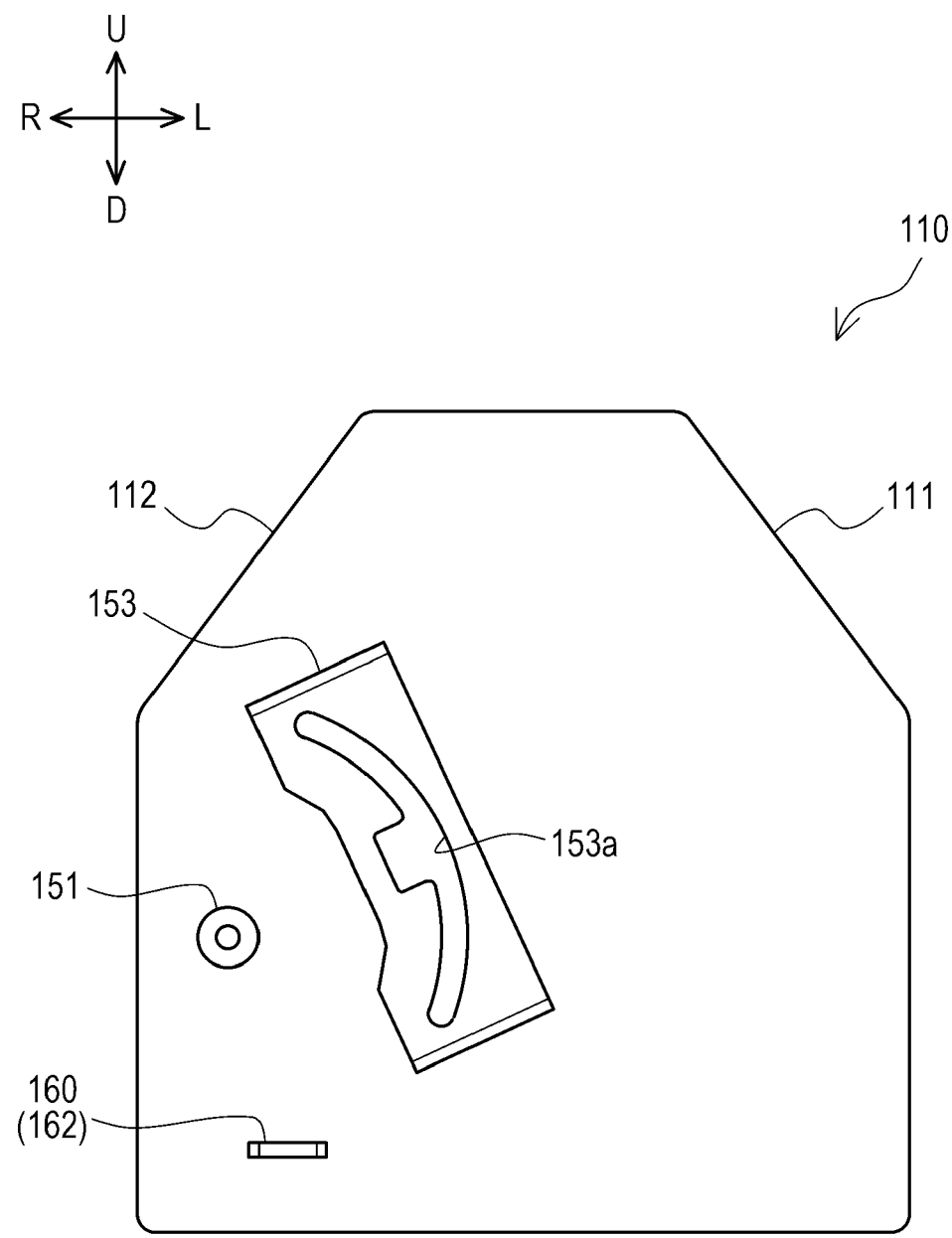
FIG. 6 is a front view illustrating the attachment portion.

The vertical rotation mechanism 150 depicted in FIGS. 5 to 7 rotates the attachment portion 110 vertically (centered on a horizontal axis line). The vertical rotation mechanism 150 is primarily equipped with a cylindrical member 151, a bolt 152, a guide member 153, a switching bolt 154, and a nut 155.

The cylindrical member 151 is formed in a cylindrical shape having an axis line oriented in the front/back direction. A rear end of the cylindrical member 151 is fixated in the vicinity of the right end portion on the front surface of the attachment portion 110 using an appropriate method. Thus, the cylindrical member 151 is positioned so as to project forward from the front surface of the attachment portion 110.

The bolt 152 couples the attachment portion 110 to the rotating member 142 so as to allow rotation. The bolt 152 is arranged with an axis line oriented in the front/back direction. The bolt 152 is inserted from forward of the cylindrical portion 142b of the rotating member 142. In addition, a rear end portion of the bolt 152 is fastened to the cylindrical member 151. This couples the attachment portion 110 to the rotating member 142 so as to allow rotation centered on the bolt 152.

The guide member 153 guides the rotation of the attachment portion 110 when the attachment portion 110 rotates relative to the rotating member 142. The guide member 153 is formed by bending a substantially rectangular plate-shaped member as appropriate. Specifically, the guide member 153 is formed by a substantially rectangular plate-shaped member having a thickness direction oriented in the front/back direction and bending both longitudinal direction ends of the member rearward. The guide member 153 is arranged to the upper left of the cylindrical member 151 such that the longitudinal direction of the guide member 153 is inclined from the upper right to the lower left. Two end portions of the guide member 153 (the two bent end portions) are fixated to the front surface of the attachment portion 110 using an appropriate method. Thus, the guide member 153 is arranged with a gap between a front surface of the guide member 153 and the front surface of the attachment portion 110. A guide hole 153a is formed on the guide member 153.

The guide hole 153a is formed so as to run through the front surface of the guide member 153 in the front/back direction. In a front view, the guide hole 153a is formed in an arc shape centered on the cylindrical member 151. A center angle of the arc (guide hole 153a) is formed to be approximately 90°. The guide hole 153a is formed to span from the vicinity of one longitudinal end of the front surface of the guide member 153 to the vicinity of the other longitudinal end. The guide hole 153a may be formed to have a substantially constant width along the entire guide hole 153a, but in the present embodiment, the guide hole 153a is formed such that a single portion (a substantially central portion) has a broader width. This portion allows the nut 155 (described below) to be inserted when assembling the support mechanism 100.

The switching bolt 154 regulates the rotation of the attachment portion 110 relative to the rotating member 142. The switching bolt 154 is arranged with an axis line oriented in the front/back direction. The switching bolt 154 is inserted from the front through the through-hole 142f of the arm 142c and through the guide hole 153a of the guide member 153. The switching bolt 154 includes a lever 154a.

The lever 154a is formed in a substantially circular columnar shape. The lever 154a is fixated to a front end of the switching bolt 154 with a longitudinal direction oriented in the left/right direction. A worker can readily rotate the switching bolt 154 by gripping and turning the lever 154a.

Together with the switching bolt 154, the nut 155 regulates the rotation of the attachment portion 110 relative to the rotating member 142. The nut 155 is formed in a polygonal shape having an outer circumferential portion that is linear in a front view. In the present embodiment, the nut 155 is formed in a rectangular shape (square shape) in a front view. The rear end portion of the switching bolt 154, which is inserted through the guide hole 153a, is inserted into the nut 155.

When the switching bolt 154 is inserted into the nut 155, in order to prevent the nut 155 from falling off the switching bolt 154, a stopper (not shown in the drawings) is fitted to the rear end portion of the switching bolt 154. From a viewpoint of improving ease of work when the switching bolt 154 is to be inserted through the guide hole 153a, the switching bolt 154 is first inserted into the nut 155 (the stopper is attached), after which the switching bolt 154 is inserted through the guide hole 153a. When doing this, the nut 155 can be passed through the guide hole 153a via the wider portion (portion where the width is formed to be broader) formed at the midway portion of the guide hole 153a.

The regulating mechanism 160 illustrated in FIGS. 5 to 8 regulates the rotation of the attachment portion 110 in the display position. The regulating mechanism 160 is primarily equipped with a first regulating member 161 and a second regulating member 162.

The first regulating member 161 is formed in substantially a rectangular plate shape with a thickness direction oriented in the left/right direction. The first regulating member 161 is arranged with a longitudinal direction oriented in the front/back direction. A front end portion of the first regulating member 161 is fixated to a left side surface of the cylindrical portion 141a of the support member 141 using an appropriate method. Thus, the regulating member 161 is positioned so as to project rearward from the cylindrical portion 141a.

The second regulating member 162 is formed in substantially a rectangular plate shape with a thickness direction oriented in the vertical direction. The second regulating member 162 is arranged with a longitudinal direction oriented in the left/right direction. A rear end portion of the second regulating member 162 is fixated to a lower right portion on the front surface of the attachment portion 110 using an appropriate method. Thus, the second regulating member 162 is positioned so as to project forward from the front surface of the attachment portion 110.

The cover member 170 illustrated in FIGS. 4 and 5 covers a portion of the attachment portion 110 when the attachment portion 110 is in the storage position (described below). The cover member 170 is formed in substantially a box shape that is open inward toward the vehicle body (rightward) by appropriately bending a plate member. The cover member 170 is arranged with a longitudinal direction oriented in the front/back direction. The front/back direction length of the cover member 170 is configured to be substantially identical to the front/back direction length of the fixation portion 120. The cover member 170 is arranged directly above the fixation portion 120. The cover member 170 is fixated to the rear end portion of the fixation portion 120 using an appropriate bolt, for example.

Next, a description is given of switching the attachment portion 110 (license plate) between the display position and the storage position using the support mechanism 100 configured as described above.

First, the attachment portion 110 in the display position is described.

Figure 2:
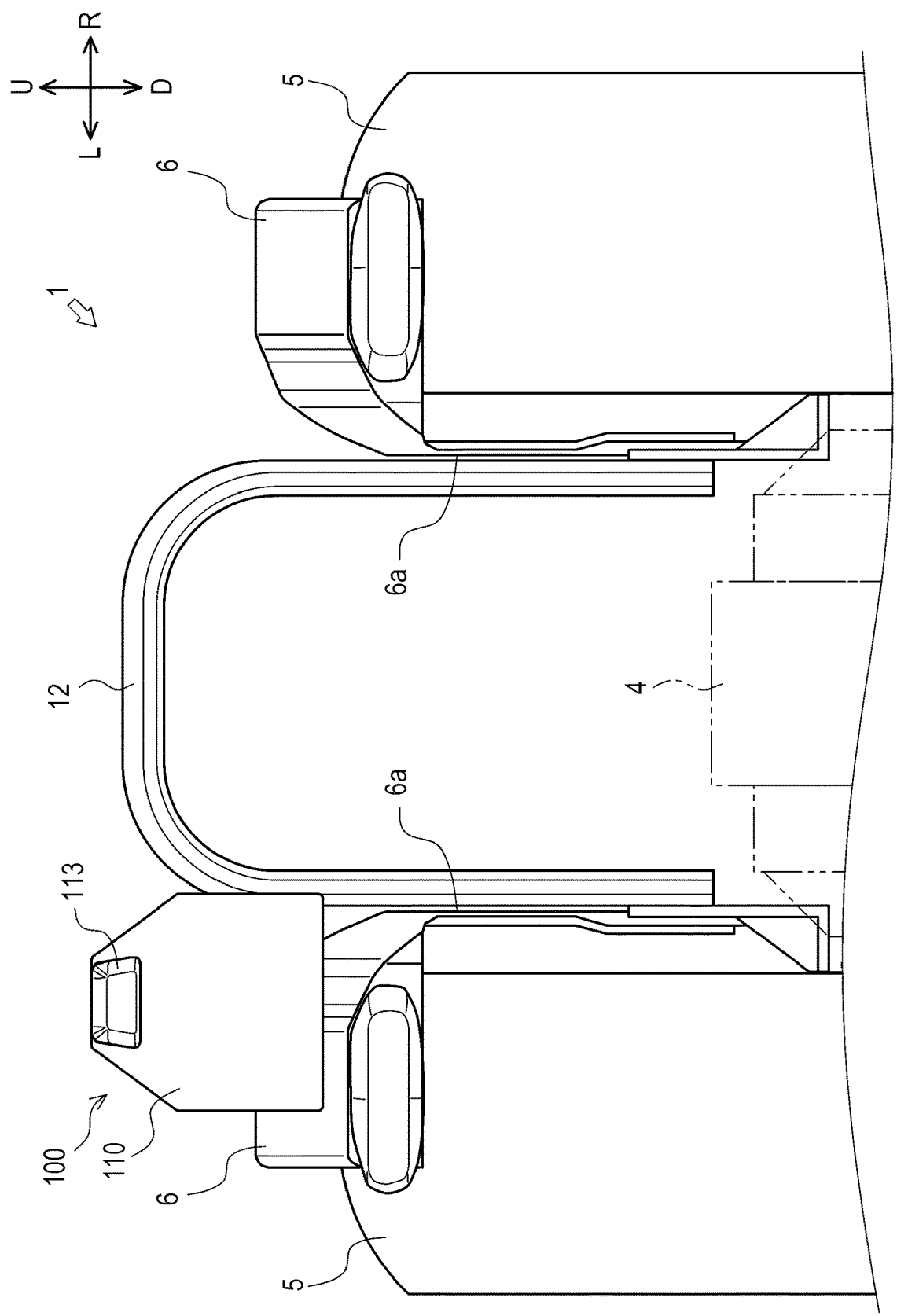
FIG. 2 is a schematic rear view illustrating the support mechanism mounted on the tractor.

When the attachment portion 110 is in the display position, as illustrated in FIGS. 2 to 4, at least a portion of the attachment portion 110 is positioned further outward than the left/right pair of rear wheel fenders 6 (more specifically, further outward than the inner surface 6a of the rear wheel fender 6). More specifically, the attachment portion 110 is positioned more or less above the left rear wheel fender 6 in a state where the surface provided with the lamp 113 (attachment surface) faces rearward. In this state, even when a work apparatus is mounted to the rear portion (left/right-direction center) of the tractor 1, visibility of the attachment portion 110 (license plate) can be ensured.

When the attachment portion 110 is in the display position, as illustrated in FIG. 5, the exterior inclined portion 111 is positioned on an upper portion of the attachment portion 110 toward the exterior of the vehicle body. By providing the inclined portion toward the exterior of the vehicle body (exterior inclined portion 111) in this way, interference with surrounding objects (such as fruit trees, for example) can be constrained. Moreover, by providing such an exterior inclined portion 111, a left-rearward field of view for the worker (passenger) seated in the seat 10 can be more readily ensured.

When the attachment portion 110 is in the display position, the switching bolt 154 is inserted through one end portion of the guide hole 153a (bottom left end portion of the guide hole 153a depicted in FIGS. 5 and 7). When the attachment portion 110 is fixated in the display position, the switching bolt 154 is fastened with the nut 155 (see FIG. 7). Accordingly, vertical direction rotation of the attachment portion 110 can be regulated. Specifically, the arm 142c and the guide member 153 are held between the switching bolt 154 and the nut 155, and therefore the rotation of the attachment portion 110 centered on the bolt 152 is regulated.

When the switching bolt 154 is fastened by the nut 155, rotation of the nut 155 must be regulated to prevent corotation of the nut 155 with the switching bolt 154 (the nut rotating together with the switching bolt 154). In the present embodiment, rotation of the nut 155 can be regulated by an outer circumferential portion (portion formed in a straight line in a front view) of the nut 155 abutting a side surface (two end portions bent rearward) of the guide member 153. Accordingly, in the present embodiment, the switching bolt 154 can be fastened by the nut 155 only when the nut 155 is positioned such that the nut 155 can abut the side surface of the guide member 153 (is in the vicinity of the two end portions of the guide member 153), i.e., only when the switching bolt 154 is inserted in the vicinity of the two end portions of the guide hole 153a. With such a configuration, fixating the attachment portion 110 in an unintended rotation position can be prevented.

In addition, when the attachment portion 110 is in the display position, the engagement pin 143 (see FIG. 8) engages with the engagement groove 141c that extends in the front/back direction, of the engagement grooves 141c of the cylindrical portion 141a. This enables rotation of the rotating member 142 relative to the support member 141 to be regulated, which consequently enables rotation of the attachment portion 110 in the left/right direction to be regulated.

Moreover, when the attachment portion 110 is in the display position, the second regulating member 162 abuts the first regulating member 161 from above (see FIG. 5). With the regulating mechanism 160 configured in this way, downward rotation of the attachment portion 110 in the display position is regulated. For example, even when the worker loosens the switching bolt 154, the downward rotation of the attachment portion 110 is regulated by the regulating mechanism 160, and therefore the attachment portion 110 can be prevented from interfering with the rear wheel fender 6 below it.

Next, a method of switching the position of the attachment portion 110 from the display position to the storage position is described.

Figure 9:
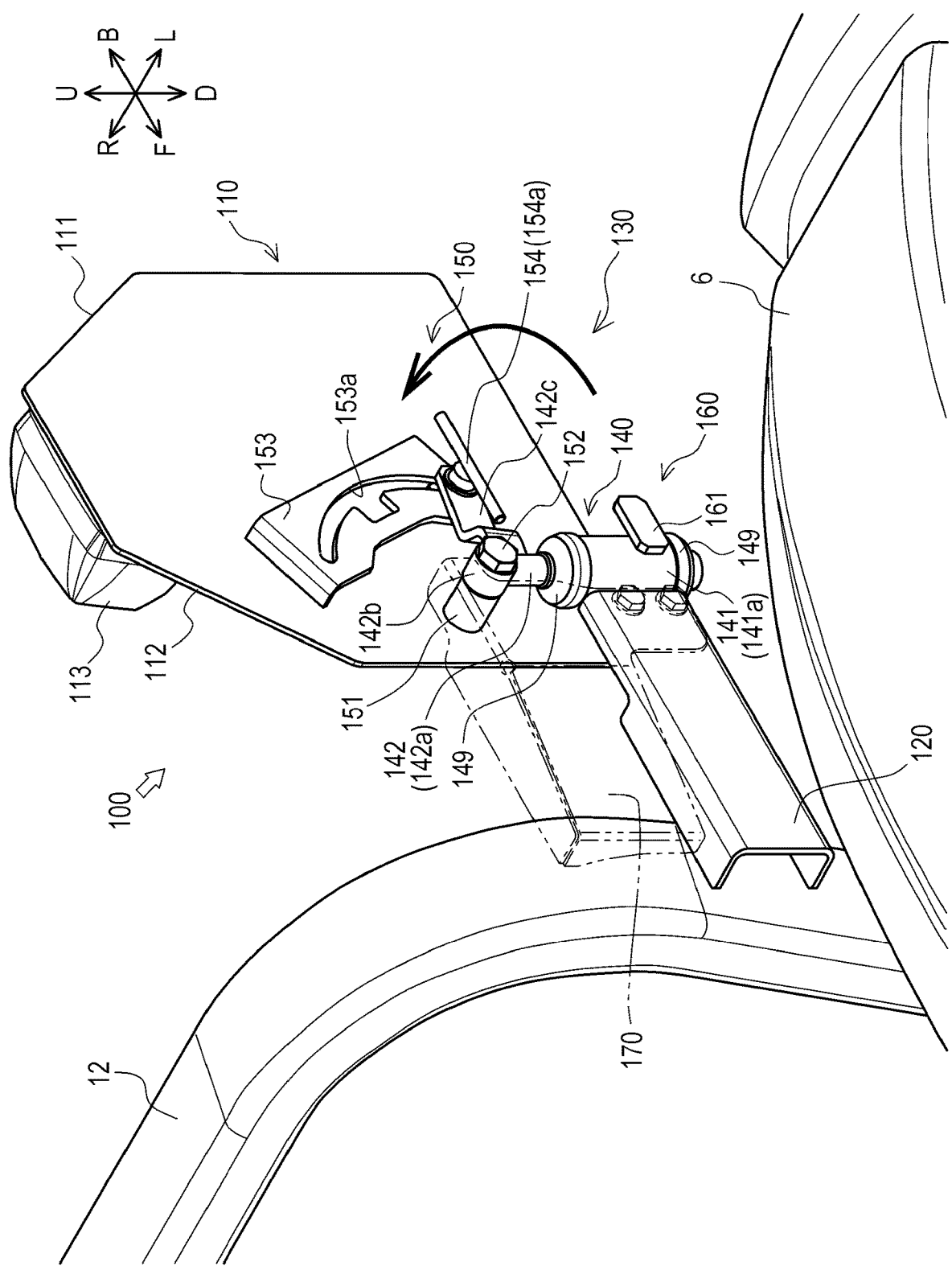
FIG. 9 is a perspective view illustrating the support mechanism in the midst of switching between the display position and a storage position.

When the attachment portion 110 is switched from the display position to the storage position, first, the attachment portion 110 is rotated counterclockwise in a plan view, as illustrated in FIG. 9. Specifically, the worker applies a force to the attachment portion 110 and causes the rotating member 142 to rotate relative to the support member 141. At this point, when the worker applies at least a certain amount of force to the attachment portion 110, the engagement pin 143 (see FIG. 8) escapes the engagement groove 141c extending in the front/back direction, enabling the rotating member 142 to rotate. When the attachment portion 110 (rotating member 142) is rotated in this state, the engagement pin 143 engages with the engagement groove 141c extending in the left/right direction. This once again regulates the rotation of the attachment portion 110 (rotating member 142). In this state, the thickness direction of the attachment portion 110 is oriented in the left/right direction, as illustrated in FIG. 9. When the attachment portion 110 is rotated in this way, the first regulating member 161 and the second regulating member 162 of the regulating mechanism 160 move away from each other and the restriction on the rotation of the attachment portion 110 applied by the regulating mechanism 160 is released.

Figure 10:
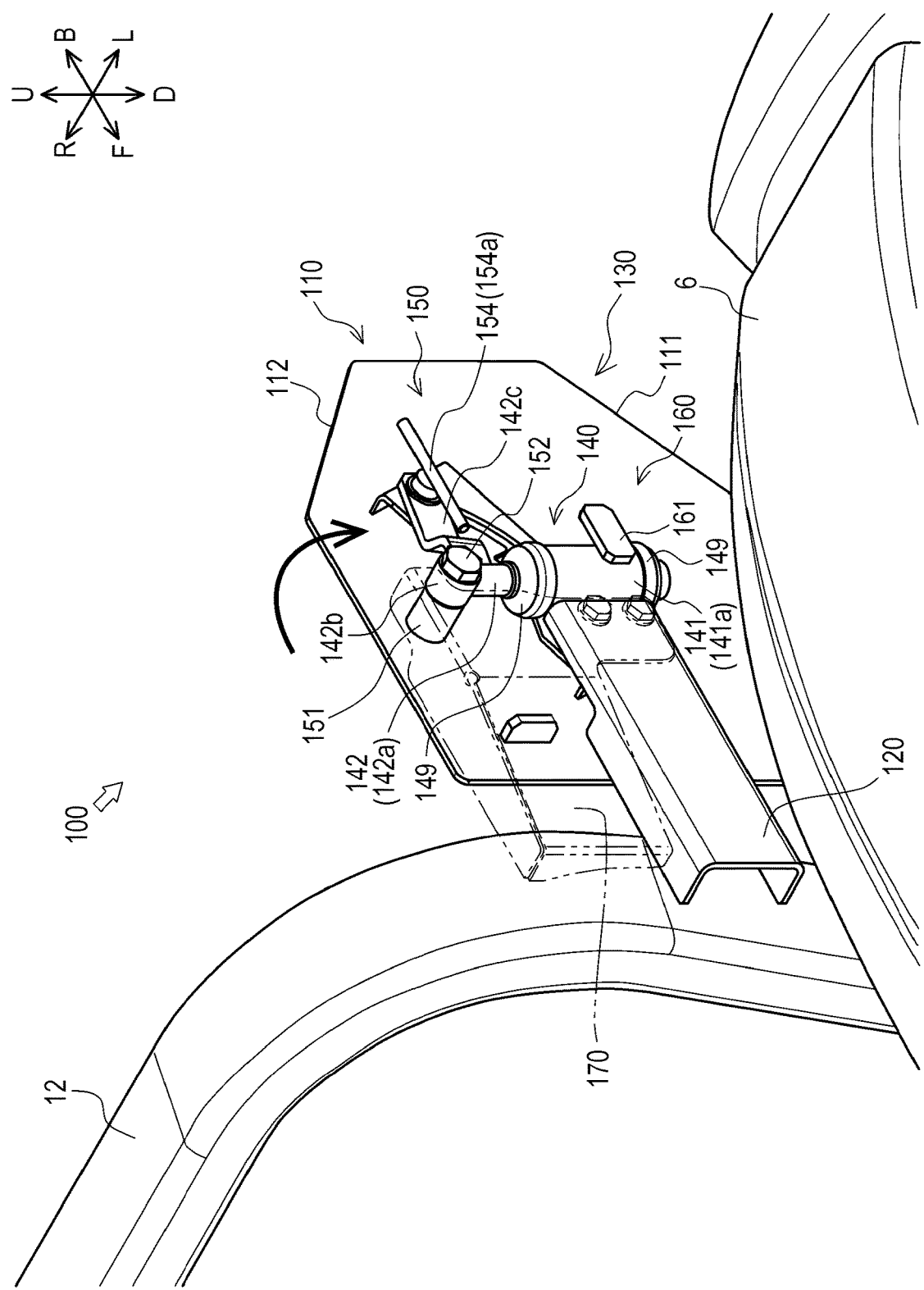
FIG. 10 is a perspective view illustrating the support mechanism when the attachment portion is in the storage position.

Next, the attachment portion 110 is rotated downward (clockwise in a left side view), as illustrated in FIG. 10. Specifically, the worker loosens the switching bolt 154 and releases the restriction on the vertical rotation of the attachment portion 110. Then, the worker rotates the attachment portion 110 downward by approximately 90°. This causes the switching bolt 154 to be inserted through the other end portion of the guide hole 153a (upper right end portion of the guide hole 153a depicted in FIGS. 5 and 7). In this state, the worker fastens the switching bolt 154 with the nut 155. Accordingly, the vertical direction rotation of the attachment portion 110 can be regulated. In this way, the attachment portion 110 is held in the storage position.

Figure 11:
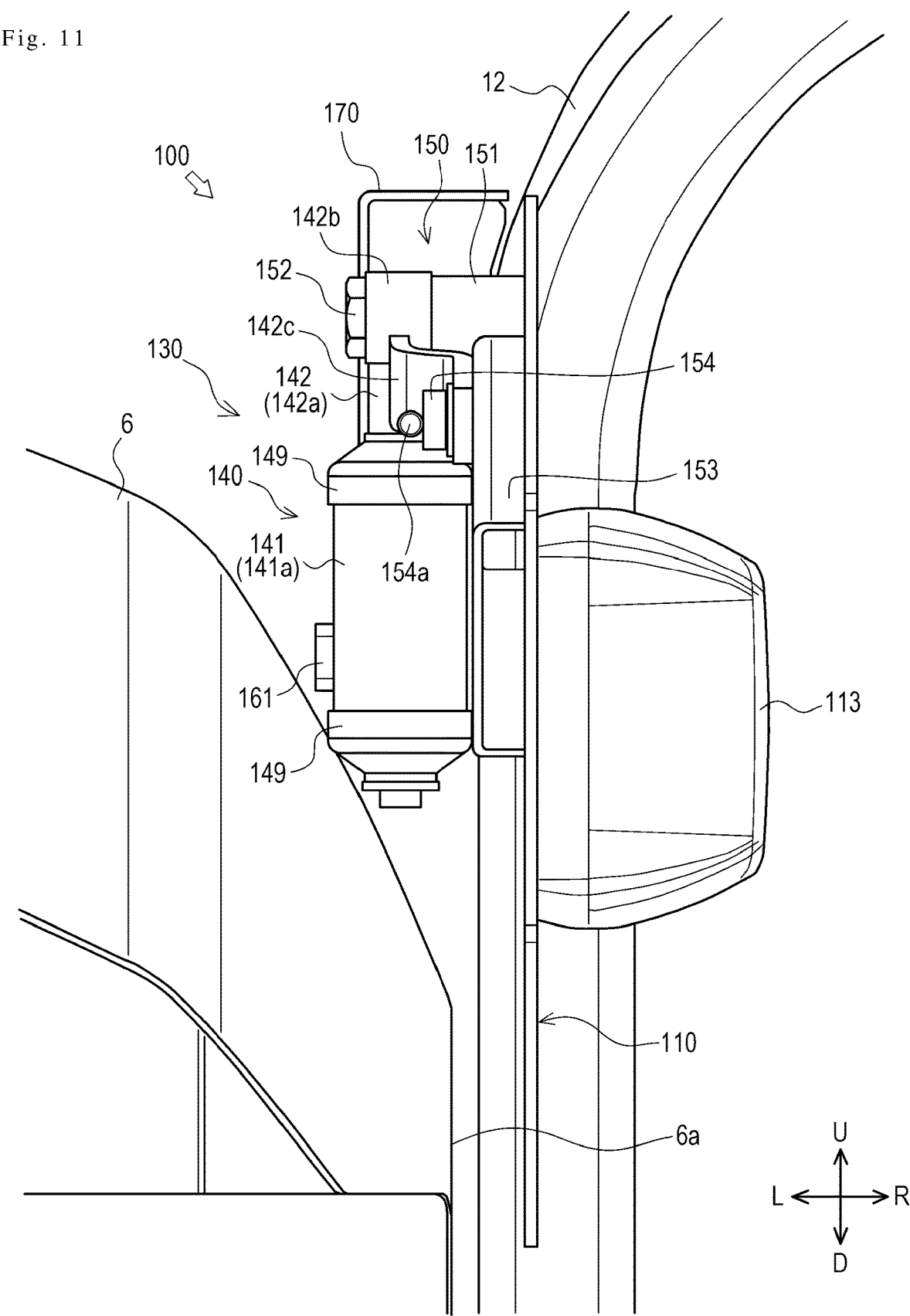
FIG. 11 is a rear view illustrating the attachment portion in the storage position.

When the attachment portion 110 is in the storage position, as illustrated in FIG. 11, the entire attachment portion 110 is positioned further inward than the left/right pair of rear wheel fenders 6 (more specifically, further inward than the inner surface 6a of the rear wheel fender 6). The inner surface 6a of the rear wheel fender 6 refers to a side surface portion on an inward side of the rear wheel fender 6 toward the vehicle body.

More specifically, when the attachment portion 110 is in the storage position, the attachment portion 110 is positioned behind (to the rear of) the rear safety frame 12 in a state where the surface provided with the lamp 113 (attachment surface) faces sideways (inward (rightward)). In this state, the attachment portion 110 is arranged so as to overlap with the rear safety frame 12 (so as to not stick out past the rear safety frame 12) in a rear view. In this state, the attachment portion 110 (license plate) does not project to the side or upward from the vehicle body of the tractor 1, and therefore interference with crops (surrounding objects) such as fruit trees, for example, can be constrained. In particular, in the present embodiment, by turning the attachment surface inward, the lamp 113 (which protrudes from the attachment surface) and the license plate mounted on the attachment surface can be turned inward and interference with surrounding objects can be more effectively constrained. When performing work that uses the tractor 1 in a field with a large number of obstacles such as fruit trees in the area, switching the attachment portion 110 to the storage position is desirable.

In addition, when the attachment portion 110 is in the storage position, the front top portion of the attachment portion 110 is covered by the cover member 170 from an outward side, as illustrated in FIG. 10. Therefore, fruit trees or other obstacles can be prevented from catching on the front top portion of the attachment portion 110.

When the attachment portion 110 is in the storage position, the interior inclined portion 112 is positioned on an upper rear portion of the attachment portion 110. By providing an inclined portion (interior inclined portion 112) that inclines rearward in the storage position in this way, a down-and-rearward field of view for the worker (passenger) seated in the seat 10 can be more readily ensured.

A method of switching the attachment portion 110 from the storage position to the display position is substantially the reverse of the above-described method of switching to the storage position.

Specifically, the attachment portion 110 in the storage position is first rotated upward approximately 90°, and downward rotation of the attachment portion 110 is regulated by the switching bolt 154. Then, by rotating the attachment portion 110 outward, the attachment portion can be switched to the display position.

As noted above, the license plate support mechanism 100 according to the present embodiment is equipped with the attachment portion 110 to which the license plate can be attached, the fixation portion 120 fixating the attachment portion 110 to the vehicle body, and the switching mechanism 130. The switching mechanism 130 couples the attachment portion 110 to the fixation portion 120 such that the attachment portion 110 is capable of displacing relative to the fixation portion 120. The switching mechanism 130 also enables the attachment portion 110 to switch between the storage position, in which the attachment portion 110 is stored on the left/right direction inward side of the left/right pair of rear wheel fenders 6, and the display position, in which the attachment portion 110 is positioned on the left/right direction outward side of the left/right pair of rear wheel fenders 6. With such a configuration, visibility of the license plate can be ensured while still constraining the attachment portion 110 (license plate) from interfering with surrounding objects (for example, crops). In other words, when there is no need to display the license plate, the attachment portion 110 can be stored on the inward side of the rear wheel fenders 6 by shifting the attachment portion 110 to the storage position, and interference with objects around the vehicle body (for example, crops such as fruit trees) can be constrained.

In addition, the attachment portion 110 is formed in a flat plate shape having the attachment surface where the license plate is attached. The switching mechanism 130 supports the attachment portion 110 in the storage position such that the attachment surface is oriented sideways, and supports the attachment portion 110 in the display position such that the attachment surface is oriented rearward. With such a configuration, interference between the attachment portion 110 and surrounding objects can be effectively constrained in the storage position, and visibility of the license plate can be ensured in the display position.

In addition, the switching mechanism 130 is equipped with the left/right rotation mechanism 140, which rotates the attachment portion 110 left and right relative to the fixation portion 120, and the vertical rotation mechanism 150, which rotates the attachment portion 110 up and down relative to the fixation portion 120. With such a configuration, the attachment portion 110 can be rotated in two directions (two stages), and therefore when the position of the attachment portion 110 is changed, interference with surrounding objects or the vehicle body is more readily avoided. For example, as in the present embodiment, the position of the attachment portion 110 can be changed without interfering with the rear wheel fenders 6 or the rear safety frame 12.

The support mechanism 100 is further equipped with the regulating mechanism 160, which regulates the downward rotation of the attachment portion 110 in the display position. With such a configuration, the attachment portion 110 can be prevented from falling in the display position. Accordingly, visibility of the license plate in the display position can be ensured.

In addition, the attachment portion 110 is configured such that at least a portion of the top end portion thereof (interior inclined portion 112) inclines rearward and downward in the storage position. With such a configuration, the field of view for the passenger can be more readily ensured. In other words, when the worker (passenger) riding forward and upward from the attachment portion 110 looks to the rear, the attachment portion 110 is unlikely to obstruct the field of view.

In addition, the attachment portion 110 is configured such that at least a portion of the top end portion thereof (exterior inclined portion 111) inclines downward and outward in the left/right direction in the display position. With such a configuration, the attachment portion 110 can be constrained from interfering with surrounding objects (for example, crops) even in the display position. In other words, by providing the inclined portion to the left/right direction exterior of the top end portion of the attachment portion 110, interference with surrounding objects is more readily avoided. Furthermore, the field of view for the passenger can be more readily ensured.

Also, the fixation portion 120 is provided to the rear safety frame 12 (safety frame), which is provided between the left/right pair of rear wheel fenders 6. With such a configuration, the license plate can be strongly supported.

In addition, the tractor 1 is equipped with the license plate support mechanism 100 described above. With such a configuration, the attachment portion 110 (license plate) can be constrained from interfering with surrounding objects (for example, crops).

The embodiment of the present invention is as described above; however, the present invention is not limited to the above configuration and various changes may be made within the scope of the invention disclosed in the claims.

For example, in the embodiment described above, the tractor 1 is given as an example of a work vehicle. However, the present invention can be applied to various other types of work vehicle (such as an agricultural vehicle, construction vehicle, or industrial vehicle).

In addition, the support mechanism 100 according to the above embodiment is configured to rotate the attachment portion 110 left/right and vertically when the attachment portion 110 (license plate) switches positions, but the present invention is not limited to this. Specifically, in the present invention, so long as the attachment portion 110 is capable of switching between the display position and the storage position, the specific configuration for doing so is not limited. For example, the attachment portion 110 can also be configured to rotate in only one direction (for example, the left/right direction) to change position (switch between the display position and the storage position).

Also, in the embodiment described above, an example is given of regulating the vertical rotation of the attachment portion 110 by fastening the switching bolt 154 with the nut 155, as illustrated in FIG. 7. However, the present invention is not limited to this, and a structure regulating the vertical rotation of the attachment portion 110 can be modified as appropriate. For example, instead of the switching bolt 154, a circular columnar pin can be inserted through the rotating member 142 and the guide member 153, and a foremost end portion of the pin can engage with a hole formed in the attachment portion 110, thereby enabling rotation of the attachment portion 110 to be regulated. Accordingly, rotation of the attachment portion 110 can be regulated or freed simply by removing or inserting the pin from/to the hole in the attachment portion 110. In this case, the regulation of the attachment portion 110 by the pin can be further facilitated by provided a biasing member (for example, a spring) that biases the pin toward the attachment portion 110.

In addition, the support mechanism 100 according to the embodiment described above is configured to include the regulating mechanism 160, which regulates the downward rotation of the attachment portion 110 in the display position. However, other mechanisms to appropriately regulate the rotation of the attachment portion 110 can also be provided.

Figure 12:
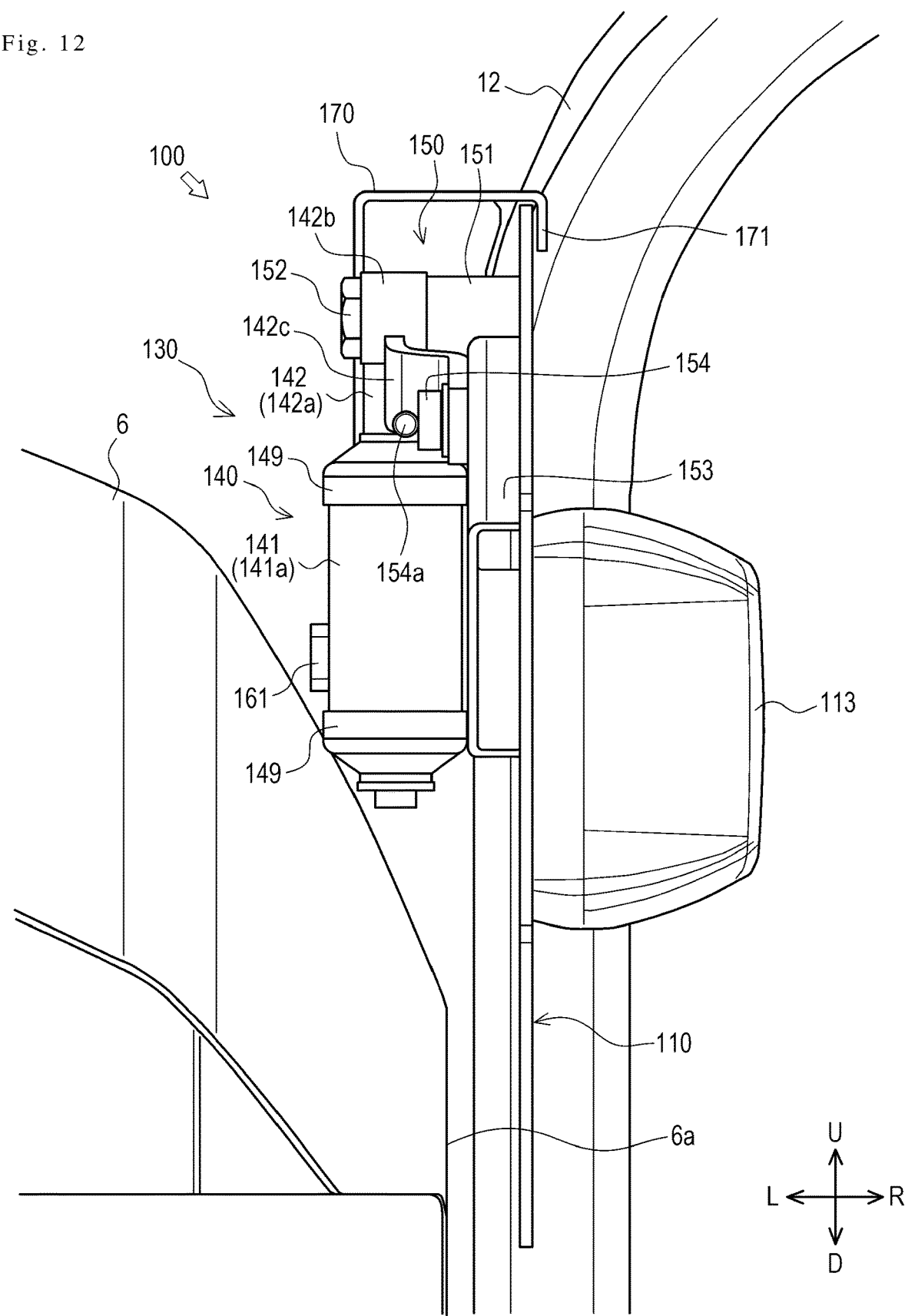
FIG. 12 is a rear view illustrating a first modification.

For example, FIG. 12 illustrates a modification (first modification) provided with a regulating portion 171 that regulates the left/right direction rotation of the attachment portion 110 in the storage position. The regulating portion 171 is configured by bending an interior end portion (right end portion) of the top surface of the cover member 170 downward. With such a configuration, the regulating portion 171 is positioned immediately to the right of the top end portion of the attachment portion 110.

In the first modification configured in this way, when the worker mistakenly attempts to rotate the attachment portion 110 in the storage position (see FIG. 10 as well) outward (leftward), the attachment portion 110 strikes the regulating portion 171 and the rotation is regulated. Accordingly, the attachment portion 110 can be prevented from rotating outward from the storage position and interfering with the rear wheel fenders 6, for example. As in the first modification, a mechanism can be provided that appropriately regulates the rotation of the attachment portion 110 such that the attachment portion 110 does not rotate in an unintended direction.

Furthermore, as in a modification (second modification) illustrated in FIG. 13, the support mechanism 100 can also be provided with a guide portion 141d that guides the attachment portion 110 when the attachment portion 110 rotates. The guide portion 141d guides the attachment portion 110 such that the attachment portion 110 rotates upward when switching from the storage position to the display position.

Specifically, the guide portion 141d is formed in substantially a triangular plate shape having an inclined portion 141e. The guide portion 141d is fixated to the rear side surface of the support member 141. The inclined portion 141e is positioned so as to incline from a lower rear right side toward an upper front left side. The inclined portion 141e can guide the attachment portion 110 upward by abutting the bottom end portion of the attachment portion 110 from below when the attachment portion 110 is rotated leftward (outward).

For example, when the attachment portion 110 switches from the storage position to the display position, as described above, the attachment portion 110 first must be rotated upward approximately 90° (see FIG. 9). Thus, when the attachment portion 110 is not rotated sufficiently (approximately 90°) upward and is then rotated outward, the attachment portion 110 may interfere with the rear wheel fenders 6. In view of this, when the guide portion 141d described in the second modification is provided, even when the attachment portion 110 is rotated outward in a state of insufficient upward rotation, the inclined portion 141e of the guide portion 141d guides the bottom end portion of the attachment portion 110 upward and interference with the rear wheel fender 6 can be avoided.

The configuration of the guide portion 141d according to the second modification is merely exemplary, and the configuration thereof is not limited so long as the portion can guide the attachment portion 110 upward (that is, toward the display position) in conjunction with outward rotation of the attachment portion 110.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A license plate support mechanism comprising:
an attachment portion to which a license plate can be attached;
a fixation portion connected to the attachment portion and fixable to a vehicle body; and
a switching mechanism that couples the attachment portion to the fixation portion such that the attachment portion is capable of being displaced relative to the fixation portion, and that also enables the attachment portion to be switched between a storage position, in which the attachment portion is stored between a pair of left and right rear wheel fenders in a left and right direction relative to a front and back axis of the vehicle body and is not overlapped with one of the pair of left and right rear wheel fenders in the left and right direction, and a display position, in which the attachment portion is positioned on an outward side in a left and right direction of the pair of left and right rear wheel fenders, and is overlapped with one of the right pair of left and right rear wheel fenders in the left and right direction,
wherein the switching mechanism comprises:
a first rotating member that rotates about a vertical axis within a first cylindrical support member so that the attachment portion can be moved in the left and right direction, and
a second rotating member that rotates about a horizontal axis within a second cylindrical support member so that the attachment portion can be rotated up and down.

2. The license plate support mechanism according to claim 1, wherein the attachment portion is formed in a flat plate shape having an attachment surface where the license plate is attached, and
the switching mechanism:
supports the attachment portion in the storage position such that the attachment surface is oriented sideways; and
supports the attachment portion in the display position such that the attachment surface is oriented rearward.

3. The license plate support mechanism according to claim 1, further comprising:
a regulating mechanism that regulates a downward rotation of the attachment portion in the display position.

4. The license plate support mechanism according to claim 3, wherein the attachment portion is configured such that at least a portion of a top end portion of the attachment portion inclines rearward and downward in the storage position.

5. The license plate support mechanism according to claim 4, wherein the attachment portion is configured such that at least a portion of the top end portion of the attachment portion inclines downward and outward in the left and right direction in the display position.

6. The license plate support mechanism according to claim 1, wherein the attachment portion is configured such that at least a portion of a top end portion of the attachment portion inclines rearward and downward in the storage position.

7. The license plate support mechanism according to claim 1, wherein the attachment portion is configured such that at least a portion of a top end portion of the attachment portion inclines downward and outward in the left and right direction, relative to a left and right axis, in the display position.

8. The license plate support mechanism according to claim 7, wherein the fixation portion is fixable to a safety frame that is provided between the pair of left and right rear wheel fenders.

9. The license plate support mechanism according to claim 1, wherein the fixation portion is fixable to a safety frame that is provided between the pair of left and right rear wheel fenders.

10. A work vehicle comprising a license plate support mechanism comprising:
an attachment portion to which a license plate can be attached;
a fixation portion connected to the attachment portion and fixable to a vehicle body; and
a switching mechanism that couples the attachment portion to the fixation portion such that the attachment portion is capable of being displaced relative to the fixation portion, and that also enables the attachment portion to be switched between a storage position, in which the attachment portion is stored between a left and right pair of rear wheel fenders in a left and right direction relative to a front and back axis and is not overlapped with one of the pair of left and right rear wheel fenders in the left and right direction, and a display position, in which the attachment portion is positioned on an outward side in the left and right direction of the pair of left and right rear wheel fenders, and is overlapped with one of the pair of left and right rear wheel fenders in the left and right direction,
wherein the switching mechanism comprises:
a left and right rotation mechanism that rotates the attachment portion left and right relative to the fixation portion; and
a vertical rotation mechanism that rotates the attachment portion up and down relative to the fixation portion.

11. The license plate support mechanism according to claim 10, further comprising:
a regulating mechanism that regulates a downward rotation of the attachment portion in the display position.

12. A license plate support mechanism comprising:
an attachment portion to which a license plate can be attached;
a fixation portion connected to the attachment portion and fixable to a vehicle body; and
a switching mechanism that couples the attachment portion to the fixation portion such that the attachment portion is capable of being displaced relative to the fixation portion, and that also enables the attachment portion to be switched between a storage position, in which the attachment portion is stored between a pair of left and right rear wheel fenders in a left and right direction relative to a front and back axis and is not overlapped with one of the pair of left and right rear wheel fenders in the left and right direction, and a display position, in which the attachment portion is positioned on an outward side in the left and right direction of the pair of left and right rear wheel fenders, and is overlapped with one of the pair of left and right rear wheel fenders in the left and right direction, wherein the switching mechanism comprises:

a left and right rotation mechanism comprising a vertical shaft disposed within a vertical cylinder that rotates the attachment portion left and right relative to the fixation portion;

a vertical rotation mechanism comprising a horizontal shaft disposed within a horizontal cylinder that rotates the attachment portion up and down relative to the fixation portion and an arcuate slot attached to or formed in the attachment portion that guides rotation of the attachment portion.

13. The license plate support mechanism according to claim 12, further comprising:

a regulating mechanism that regulates a downward rotation of the attachment portion in the display position.

14. The license plate support mechanism according to claim 12, wherein the attachment portion is configured such that at least a portion of a top end portion of the attachment portion inclines rearward and downward in the storage position.

15. The license plate support mechanism according to claim 12, wherein the attachment portion is configured such that at least a portion of a top end portion of the attachment portion inclines downward and outward in the left and right direction, relative to a left and right axis, in the display position.

16. The license plate support mechanism according to claim 12, wherein the fixation portion is fixable to a safety frame that is provided between the pair of left and right rear wheel fenders.

\* \* \* \* \*

UNITED STATES PATENT AND TRADEMARK OFFICE
CERTIFICATE OF CORRECTION

PATENT NO. : 10,661,728 B2
APPLICATION NO. : 16/017130
DATED : May 26, 2020
INVENTOR(S) : K. Tsuji et al.

Page 1 of 1

It is certified that error appears in the above-identified patent and that said Letters Patent is hereby corrected as shown below:

In the Claims

At Column 15, Line 63 (Claim 5, Line 3), please change "the top end" to -- a top end --.

Signed and Sealed this
Third Day of November, 2020

Andrei Iancu
*Director of the United States Patent and Trademark Office*